US 12,367,289 B2

(12) United States Patent
Clark et al.

(10) Patent No.: US 12,367,289 B2
(45) Date of Patent: Jul. 22, 2025

(54) THREAT DETECTION AND MITIGATION IN A NETWORKED ENVIRONMENT

(71) Applicant: The Toronto-Dominion Bank, Toronto (CA)

(72) Inventors: Rachel L. Clark, Gravenhurst (CA); Mariam Mourtada, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 209 days.

(21) Appl. No.: 18/046,748

(22) Filed: Oct. 14, 2022

(65) Prior Publication Data

US 2024/0126889 A1 Apr. 18, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ............. G06F 21/577; G06F 2221/034; G06F 2221/033
See application file for complete search history.

(56) References Cited

U.S. PATENT DOCUMENTS

| | | | |
|---|---|---|---|
| 8,744,894 B2 | 6/2014 | Christiansen et al. | |
| 9,438,626 B1 | 9/2016 | Zilberberg et al. | |
| 9,501,647 B2 | 11/2016 | Yampolskiy et al. | |
| 10,375,104 B1 | 8/2019 | Wu et al. | |
| 11,349,863 B2 | 5/2022 | Akella et al. | |
| 2015/0331864 A1* | 11/2015 | Lucas | G06F 16/24578 707/692 |
| 2019/0044969 A1* | 2/2019 | Pilkington | H04L 63/1433 |
| 2020/0314134 A1* | 10/2020 | Izrael | G06F 21/552 |
| 2023/0153443 A1* | 5/2023 | Coppins | G06F 21/6245 726/25 |

OTHER PUBLICATIONS

U.S. Appl. No. 18/079,733, Dec. 12, 2022, Dzeparoska et al.

\* cited by examiner

*Primary Examiner* — Esther B. Henderson
(74) *Attorney, Agent, or Firm* — Rowand LLP

(57) ABSTRACT

One example method includes obtaining, based on network activity related to an object deployed within a networked environment, a number of threat events for the object and a corresponding set of severity scores. An aggregate risk score can be generated for the object based on the number of threat events and the corresponding severity scores. The aggregate risk score can be refined based on at least one weighting parameter to obtain an intermediate score. The intermediate score can be scaled, using a scaling function, to obtain an overall risk score that represents a value within a predefined numerical range. Access of the object to system resources can be controlled based on whether the overall risk score exceeds the predetermined risk threshold value, with access being allowed when the overall risk score exceeds the predetermined threshold and access being restricted when the overall risk score does not exceed the predetermined threshold.

19 Claims, 7 Drawing Sheets

THREAT DETECTION AND MITIGATION IN A NETWORKED ENVIRONMENT

TECHNICAL FIELD

The present disclosure relates to computer-implemented methods, software, and systems for assessing risks of objects using a weighted risk scoring algorithm and controlling access of the objects to system resources.

BACKGROUND

Modern computer systems and networks have to address and protect themselves from the numerous threats that are designed to infiltrate and/or compromise the security of these systems and networks. Examples of such threats include, among others, viruses, ransomware, and malicious actors attempting to gain unauthorized access to computer systems and networks.

Conventional threat monitoring systems generally employ an aggregate risk scoring approach to determine a threat level for an object (e.g., an endpoint) in a network. This aggregate risk scoring approach determines the threat level of the object by evaluating multiple risk factors relating to the object and assigning a respective score to each evaluated risk factor. The scores for the various risk factors are then aggregated (e.g., summed up) to obtain an aggregate risk score for the object. In general, these conventional threat monitoring systems are implemented so that there is direct correlation between aggregate risk score and the likelihood that a threat is present. So, for example, such conventional threat monitoring systems treat a high aggregate risk score as indicative of a high likelihood of the presence of a threat, whereas a low aggregate risk score is treated as being indicative of a low likelihood of the presence of a threat.

SUMMARY

The present disclosure generally relates to systems, software, and computer-implemented methods for assessing risks of objects using a weighted risk scoring algorithm and controlling access of the objects to system resources. As used in this specification, an object represents an entity that can be used to access resources of a network. Examples of objects include, among others, endpoints in a networked environment, user accounts, system accounts, and service accounts that can be used to access network resources, etc.

A first example method includes obtaining, based on network activity related to an object deployed within a networked environment, a number of threat events for the object and a corresponding set of severity scores. An aggregate risk score can be generated for the object based on the number of threat events and the corresponding set of severity scores. The aggregate risk score can be refined based on at least one weighting parameter to obtain an intermediate score. The intermediate score can be scaled, using a scaling function, to obtain an overall risk score that represents a value within a predefined numerical range. The overall risk score is compared with a predetermined risk threshold value to determine the type of corrective security action to take. For example, if it is determined that the overall risk score satisfies (e.g., meets or exceeds) a predetermined risk threshold value, the object's access to system resources can be controlled.

Implementations can optionally include one or more of the following features.

In some implementations, the scaling function, which is used to scale the intermediate risk to obtain the overall risk score, is a logarithmic sigmoid function.

In some implementations, the logarithmic sigmoid function is represented by the following function:

$$\frac{\ln(1 + x/w)}{1 + \ln(1 + x/w)}$$

where, x represents the overall risk score and w represents a tunable weight parameter.

In some implementations, the at least one weighting parameter comprises one or more of: a number of distinct use cases triggered during the number of threat events, a number of MITRE attacks tactics used during the number of threat events, and a category of the object.

In some implementations, the intermediate score is determined based on the aggregate risk score of the object, a category of the object, the number of use cases triggered during the threat event(s), and the MITRE tactics used during the threat events. In some implementations, the computation of the intermediate risk score can be represented using the following equation:

Intermediate score=Aggregate Risk Score*Category*use_case_count*$2^{tactic\_count}$ where Category represents a category of the object, use_case_count represents a number of distinct use cases triggered during the number of threat events, and tactic_count represents a number of MITRE attacks tactics used during the number of threat events.

In some instances, the number of threat events for the object and the corresponding set of severity scores are obtained in response to determining an anomalous behavior by the object or the occurrence of a predetermined event that triggers risk score generation for a plurality of objects in the networked environment.

In some instances, the predefined numerical range is a numerical range between 0.0 and 1.0.

In some instances, controlling the access of the object to the system resources comprises: restricting access of the object to resources within the networked environment.

In some instances, the aggregate risk score is generated using the following equation:

$$\text{Aggregrate Risk Score} = \sum_i \text{severity}_i * \text{events\_count}_i$$

wherein $\text{severity}_i$ represents a severity score of $i^{th}$ type of threat event, and $\text{events\_count}_i$ represents a number of threat events of the $i^{th}$ type.

Similar operations and processes associated with each example system may be performed in a different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

The techniques described herein can be implemented to achieve the following advantages. For example, in some implementations, the techniques described herein can be used to enhance security of computer systems and networks by providing a more accurate risk assessment of an object (as that term is further described in this specification) than conventional approaches. Unlike conventional aggregate risk scoring approaches that combine severity with the number of detected events, the techniques described herein can compute a refined risk score that further scales/modulates the aggregate risk score by one or more factors, such as number of distinct use cases triggered during detected events, the number of MITRE attacks tactics used during the detected events, and the category of the object. These factors are typical indicators of an advanced persistent threat actor, and thus can elevate advanced persistent threat actors that may not be detectable by the conventional aggregate risk scoring approaches, which do not involve the one or more factors in risk score calculations.

As another example, in some instances, the techniques described herein can further enhance security of computer systems and networks by using a logarithmic sigmoid function (as further described herein) that achieves a bounding of the risk score to a range between 0.0 and 1.0. This can further alleviate the deficiencies in prior aggregate risk scoring approaches that resulted in unbounded risk scores, with the result that actual threats having relatively low aggregate risk scores may be undetected or remain unidentified as actual threats. In contrast, the novel logarithmic sigmoid function described herein not only achieves the bounding of the aggregate risk scores, but it also does so in a manner that elevates threat actors that conventionally can be undetectable because of their relatively low aggregate risk score. To that end, in some implementations, the logarithmic sigmoid function described here achieves significant improvement over other sigmoid functions. Those sigmoid functions generally grow exponentially from 0 to 1, thus resulting in a high concentration of the risk scores near 1, which in turn obfuscates the actual threat level of the various objects. In contrast, the logarithmic sigmoid based function described herein gradually or slowly increases from 0 to 1, thus achieving a more accurate and natural distribution of threats presented by different objects in this stated range.

In this manner, the techniques described herein enable more accurate threat detection that overcomes the limitations of conventional risk scoring techniques, and allows identification of actual threats, including those presented by Advanced Persistent Threat (APT) actors who were previously difficult to detect using the conventional risk detection/scoring techniques. The refined and higher accuracy threat detection described in this specification enable early and more active security countermeasures (e.g., such as restricting or limiting access of certain objects to the overall network and its resources) that achieve great network and computer security than offered by conventional threat detection systems.

In this regard, the techniques described herein achieve significant computer and network security benefits. Moreover, the improved computer and network security techniques described herein further result in greater computing resource efficiencies. For example, the unreliability of aggregate risk scores computer by conventional techniques generally results in additional post-processing of the underlying object to determine if an identified threat is actually a threat before any corrective action can be taken (or alternatively, to ascertain whether an object poses a threat despite a determination that it poses no threat). In contrast, the techniques described herein achieve higher accuracy in detection of actual threats, which thus reduces or eliminates the need for consuming computing and network resources otherwise required to confirm or ascertain the presence of an actual threat. This in turn can allow faster remediation of the threat via corrective security measures—e.g., before a potential attack is initiated and compromises a portion or all aspects of a secured network environment.

DETAILED DESCRIPTION

Figure 1:
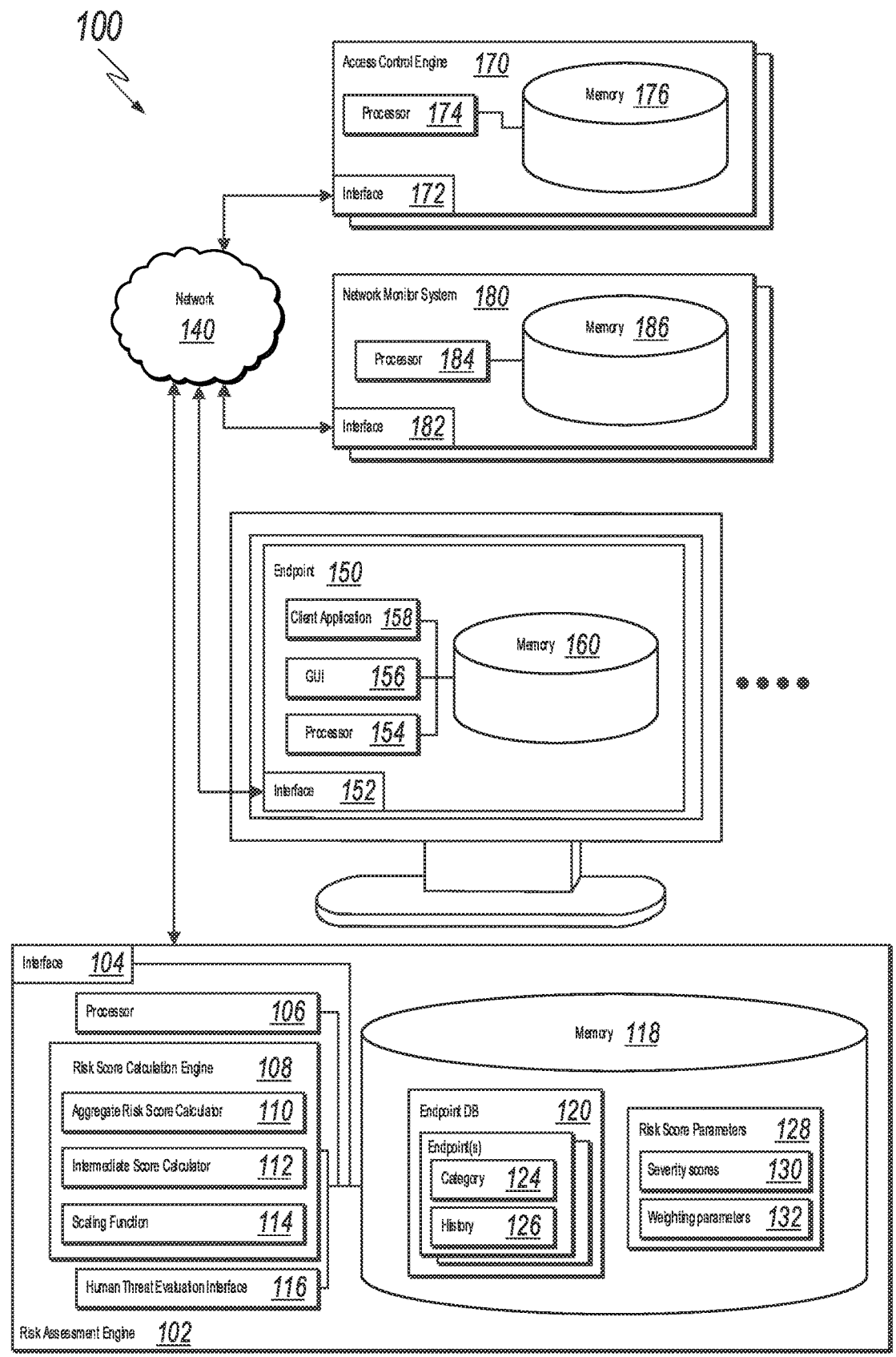
FIG. 1 is a block diagram of an example networked environment for detecting and remediating threats posed by objects in the networked environment.

The present disclosure describes various tools and techniques associated with assessing risks of objects using a weighted risk scoring algorithm and controlling access of the objects to system resources.

As noted, conventional threat monitoring systems generally employ an aggregate risk scoring approach to determine a threat level for an object (e.g., an endpoint) in a network. However, the aggregate risk scoring approach suffers from multiple deficiencies. As an initial matter, this aggregate risk scoring approach generates an unbounded score, i.e., a computed score that does not have any upper bound, which thus means that the aggregate risk score can be a very large and unbounded number. Conventional threat monitoring systems directly correlate the aggregate risk score with the threat presented by an object, such that higher aggregate risk scores are deemed as higher threat. However, such computation of aggregate risk scores generally aggregates event severity and number of risk events, but does not account for any additional factors about the risk events that can indicate a reduced threat. As a result, higher aggregates scores, which are also unbounded, may not actually indicate a threat and can lead to the adverse effect of leaving unidentified actual threats for which the corresponding aggregate risk score may be relatively lower.

This deficiency is illustrated by the following example. An endpoint operated by a system administrator may perform numerous operations that may be deemed as high risk even though these operations are routine for a system administrator. As a result, the system administrator's endpoint may have a high aggregate risk score, despite not actually being a threat actor. In contrast, an active threat posed by another object that does not perform as many risk-triggering operations may be assessed as having an aggregate risk score that is relatively lower than the aggregate risk score computed for the system administrator. Because of the relatively lower score detected for this object, this object may not be deemed a threat.

This phenomenon can be exploited by an APT actor who gains unauthorized access to a computer network, remains undetected for an extended period (e.g., by limiting the actions performed while within the network), and then launches its attack against the system or network after remaining dormant for the extended period of time. For example, an endpoint of a bank's network may be used to gain unauthorized, privileged access to the network. Although the bank's threat monitoring system may identify this system access as anomalous behavior, the malicious entity may intentionally lay dormant and take limited or no actions for a large timeframe (e.g., 3 months) before carrying out its attack. As a result, after a certain predetermined time (e.g., 3 months), the threat monitoring system will detect no further risk issues with respect to the detected anomaly and may assess a low aggregate risk score for this threat. Because of the low aggregate risk score, the APT may not be treated as an actual threat and after a certain time period (e.g., 3 months) may no longer be actively monitored. At that point, the APT actor may use the compromised endpoint to regain unauthorized access to the network and use its elevated privilege status to further compromise the security of other aspects of the network.

As the above example illustrates, conventional threat detection approaches, particularly those that utilize an aggregate risk scoring approach, are generally deficient in that they are unable to accurately identify actual threats faced by the computer systems or networks, thus exposing these environments to cybersecurity attacks.

In contrast, the techniques described herein enable accurate detection of actual threats faced by a network environment, including those threats (e.g., as posed by APTs) that can be hard to detect. In some implementations, the techniques described herein implement a threat detection and remediation system that can be used to implement a weighted risk scoring algorithm that modulates or fine tunes an aggregate risk score with weighting parameter(s), and further utilizes an innovative logarithmic sigmoid based function to achieve sensible bounding of the computed risk score (e.g., to a range between 0.0 and 1.0). At a high level, this algorithm computes an aggregate risk score for an object (e.g., by combining the number of events during a pre-determined period with the severity of those events) in a networked environment, and then generates an intermediate score that adjusts the computed aggregate risk score based on one or more additional risk factors, such as a number of distinct use cases triggered during detected events, a number of MITRE attacks tactics used during the detected events, and a category of the object. The algorithm scales the intermediate score based on a scaling function, such as the logarithmic sigmoid function (which is further described below), to map the intermediate score to an overall risk score value that is within the range of 0 and 1. The computed overall risk score is compared with a predetermined risk threshold value (e.g., a statically or dynamically determined threshold value, such as 0.5), and if the overall risk score satisfies (e.g., meets or exceeds) the predetermined risk threshold value, the system can implement corrective or security measures, including controlling access of the object to network and/or system resources of the networked environment. Additional structural and operational details of the threat detection and remediation system are described below.

The techniques described herein can be used in the context of network security and in particular, accurate detection of threats posed by objects in a networked environment and taking corrective action in response to such detection. One skilled in the art will appreciate that the above described techniques are not limited to just this network security application but can be applicable in other contexts. For example, in some implementations, the above described techniques can be used to detect credit card fraud and taking corrective actions to stop further fraud. Using the above-described algorithm, fraudulent activity can be detected, e.g., in credit card/bank account transactions, and corrective actions can be taken to, e.g., stop further fraud, identify the fraudulent actor, put all further transactions on the card on hold until a new payment token (e.g., credit card is issued). For this use case, a monitoring system can generate an intermediate score for a particular bank account by refining the aggregate risk score for this account by one or more factors, and then further scale the intermediate score based on the logarithmic sigmoid function to obtain an overall risk score. The monitoring system can compare the overall risk score with a threshold. If the overall risk score exceeds the threshold, the monitoring system can report the credit card holder for further investigations.

Turning to the illustrated example implementation, FIG. 1 is a block diagram illustrating an example networked environment 100 for detecting and remediating threats posed by objects in the networked environment. As further described with reference to FIG. 1, the environment implements various systems that interoperate to detect risks or threats posed by various objects in the network and take remediation or security actions in response to detected risks or threats (e.g., controlling access of the objects to system resources).

As shown in FIG. 1, the example environment 100 includes a network monitor system 180, a risk assessment engine 102, an access control engine 170, and multiple endpoints 150 that are interconnected over a network 140. The function and operation of each of these components is described below.

In some implementations, the illustrated implementation is directed to a solution where the network monitor system 180 can continuously monitor the activities of various objects (e.g., endpoints) in the network and detect the threat events (which are also simply referred to as events in this document) of endpoint 150. The network monitor system 180 can transmit the detected threat events to the risk assessment engine 102 over network 140. The risk assessment engine 102 can compute, using an aggregate risk score calculator 110 included in a risk score calculation engine 108, an aggregate risk score for one or more endpoints 150 (e.g., by combining the number of threat events during a pre-determined period with the severity of those threat events). The intermediate score calculator 112 can generate an intermediate score for the endpoint/object that adjusts the aggregate risk score based on one or more factors, such as a number of distinct use cases triggered during detected threat events, a number of MITRE attacks tactics used during the detected threat events, and the category of the endpoint 150. The scaling function 114 can then scale the intermediate score to obtain an overall risk score that represents a value within a predefined numerical range (e.g., a range from 0.0 to 1.0 or 0 to 100).

In some implementations, the risk assessment engine 102 can transmit, over the network 140, the overall risk score of the one or more endpoint 150 to the access control engine 170. The access control engine 170 determines whether the overall risk for a particular endpoint 150 reflects an actual threat. In some implementations, the access control engine 170 determines whether a particular endpoint 150 poses an actual threat by comparing the overall risk score to a predetermined risk threshold value. If the access control engine 170 determines that the overall risk score for the endpoint 150 satisfies (e.g., meets or exceeds) the predetermined risk threshold value, the access control engine 170 determines that the particular endpoint 150 poses an actual threat. In some implementations, the access control engine 170 can take a remediation action in response to determining the presence of an actual threat, such as, e.g., controlling access of the endpoint 150 to system and network resources.

On the other hand, if the access control engine 170 determines that the overall risk score for the endpoint 150 does not satisfy (e.g., is less than) the predetermined risk threshold value, the access control engine 170 determines that the particular endpoint 150 does not pose an actual threat. In some implementations, the access control engine 170 can take no further action in response to determining that the particular endpoint 150 does not pose an actual threat. Alternatively, or additionally, notwithstanding the determination that the particular endpoint 150 does not pose an actual threat, the access control engine 170 can request the risk assessment engine 102 to monitor the particular endpoint 150 for a predetermined time (e.g., three months). In response to receiving this request, the risk assessment engine 102 can begin continuously monitoring the endpoint 150, which could include performing the risk score calculation and routinely reporting (e.g., with a predetermined frequency of, e.g., one week) the same to access control engine 170 to assess whether the object poses a threat.

Alternatively, in some implementations, the above-described threat assessment (which compares the overall risk score to predetermined risk threshold value) can instead be performed by the risk assessment engine 102. In such implementations, the risk assessment engine 102 determine whether or not the endpoint 150 poses a threat and then it communicates that threat determination to the access control engine 170, which then performs the above-described security remediation actions.

As described above, and in general, the environment 100 enables the illustrated components to share and communicate information across devices and systems (e.g., risk assessment engine 102, network monitor system 180, access control engine 170, endpoint 150, among others) via network 140. As described herein, the risk assessment engine 102, the network monitor system 180, the access control engine 170, and/or the endpoint 150 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server. Conversely, functionality that is shown or described as being performed by one component, may be performed and/or provided by two or more components, systems, or servers.

As used in the present disclosure, the term "computer" is intended to encompass any suitable processing device. For example, the risk assessment engine 102, the network monitor system 180, the access control engine 170, and/or the endpoint 150 may be any computer or processing devices such as, for example, a blade server, general-purpose personal computer (PC), Mac®, workstation, UNIX-based workstation, or any other suitable device. Moreover, although FIG. 1 illustrates a single risk assessment engine 102, a single network monitor system 180, and a single access control engine 170, any one of the risk assessment engine 102, the network monitor system 180, and the access control engine 170 can be implemented using a single system or more than those illustrated, as well as computers other than servers, including a server pool. In other words, the present disclosure contemplates computers other than general-purpose computers, as well as computers without conventional operating systems.

Similarly, the endpoint 150 may be any system that can request data and/or interact with the risk assessment engine 102, the network monitor system 180, and the access control engine 170. The endpoint 150, also referred to as client device 150, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™ Android™, Windows Phone OS, or iOS™, among others. The endpoint 150 may include one or more merchant- or financial institution-specific applications executing on the endpoint 150, or the endpoint 150 may include one or more Web browsers or web applications that can interact with particular applications executing remotely from the endpoint 150, such as the risk score calculation engine 108, among others.

As illustrated, the risk assessment engine 102 includes or is associated with interface 104, processor(s) 106, risk score calculation engine 108, human threat evaluation interface 116, and memory 118. While illustrated as provided by or included in the risk assessment engine 102, parts of the illustrated components/functionality of the risk assessment engine 102 may be separate or remote from the risk assessment engine 102, or the risk assessment engine 102 may itself be distributed across the network 140.

The interface 104 of the risk assessment engine 102 is used by the risk assessment engine 102 for communicating with other systems in a distributed environment—including within the environment 100—connected to the network 140, e.g., the network monitor system 180, the access control engine 170, the endpoint 150, and other systems communicably coupled to the illustrated risk assessment engine 102 and/or network 140. Generally, the interface 104 comprises logic encoded in software and/or hardware in a suitable combination and operable to communicate with the network 140 and other components. More specifically, the interface 104 can comprise software supporting one or more communication protocols associated with communications such that the network 140 and/or interface's hardware is operable to communicate physical signals within and outside of the illustrated environment 100. Still further, the interface 104 can allow the risk assessment engine 102 to communicate with the network monitor system 180, the access control engine 170, the endpoint 150, and/or other portions illustrated within the risk assessment engine 102 to perform the operations described herein.

The risk assessment engine 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the risk assessment engine 102. Specifically, the processor 106 executes the algorithms and operations described in the illustrated figures, as well as the various software modules and functionality, including the functionality for sending communications to and receiving transmissions from the network monitor system 180, the access control engine 170, the endpoint 150, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the risk assessment engine 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including, e.g., C, C++, JavaScript, Java™, Visual Basic, assembler, Perl®, any suitable version of 4GL, as well as others.

The risk assessment engine 102 can include, among other components, one or more applications, entities, programs, agents, or other software or similar components configured to perform the operations described herein. As illustrated, the risk assessment engine 102 includes or is associated with a risk score calculation engine 108. The risk score calculation engine 108 may be any application, program, other component, or combination thereof that, when executed by the processor 106, enables calculation of the overall risk score(s) of endpoint(s) 150.

As illustrated, the risk score calculation engine 108 can include an aggregate risk score calculator 110, an intermediate score calculator 112, and a scaling function 114—each of which can include or specify programmable instructions for computing the aggregate risk score, intermediate risk score, and a scaled version of an overall risk score. For an endpoint 150, the aggregate risk score calculator 110 can compute an aggregate risk score based on activity related to the endpoint 150 over a predetermined aggregation period (e.g., 90 days). The intermediate score calculator 112 can then compute, for the endpoint 150, an intermediate score using the aggregate risk score and one or more factors, such as the number of distinct use cases triggered during detected threat events, the number of MITRE attacks tactics used during the detected threat events, and the category of the endpoint 150. The scaling function 114 can then scale the computed intermediate score to obtain an overall risk score, where the overall risk score can be a number between 0.0 and 1.0.

As illustrated, the risk assessment engine 102 can include a human threat evaluation interface 116. In some implementations, upon determining that an endpoint poses a threat (e.g., the overall risk score of the endpoint exceeds a predetermined risk threshold value) and before applying any corrective action, the threat assessment may be sent, via the human threat evaluation interface 116 and over network 140, to a system administrator's system (not shown) where a human verifier can further evaluate whether the detected threat is an actual threat or not. In such implementations, the human verifier can communicate, using the administrator's system and to the access control engine 170, whether the particular endpoint 150 poses an actual threat and then, the access control engine 170 can implement corrective action with respect to the particular endpoint 150 (in the same manner as described above). In some implementations, the human verification is optional and need not be performed as part of the threat detection/determination described above.

The risk assessment engine 102 also includes memory 118, which may represent a single memory or multiple memories. The memory 118 may include any memory or database module and may take the form of volatile or non-volatile memory including, without limitation, magnetic media, optical media, random access memory (RAM), read-only memory (ROM), removable media, or any other suitable local or remote memory component. The memory 118 may store various objects or data associated with the risk assessment engine 102, including any parameters, variables, algorithms, instructions, rules, constraints, or references thereto. While illustrated within the risk assessment engine 102, memory 118 or any portion thereof, including some or all of the particular illustrated components, may be located remote from the risk assessment engine 102 in some instances, including as a cloud application or repository, or as a separate cloud application or repository when the risk assessment engine 102 itself is a cloud-based system. As illustrated, memory 118 includes an endpoint database 120 and risk score parameters 128. The endpoint database 120 can store various data associated with endpoint(s), including each endpoint's category 124 and history 126. The categories of endpoints can include, but not limited to, System account, Service account, User account, and Unknown. The history 126 of an endpoint can include, among other things, previously computed overall risk scores for the particular endpoint, activity related to the endpoint over a predetermined aggregation period (e.g., one or more types of threat events and a respective number of threat events corresponding to each type of threat event triggered by the endpoint over the predetermined aggregation period). The risk score parameters 128 can include one or more severity scores 130, each severity score representing a severity level of a corresponding type of threat event. The risk score parameters 128 can also include one or more weighting parameters 132 applied to the weighted risk scoring algorithm.

Network 140 facilitates wireless or wireline communications between the components of the environment 100 (e.g., between the risk assessment engine 102, the network monitor system 180, the access control engine 170, the endpoint 150, etc.), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the risk assessment engine 102, the network monitor system 180, the access control engine 170, the endpoint 150, etc.) may be included within or deployed to network 140 or a portion thereof as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As noted, the network monitor system 180 can continuously monitor activities of endpoint(s) 150 and detect threat events of the endpoint(s) 150. In some examples, the network monitor system 180 can store the detected threat events of the endpoint(s) 150 (e.g., in memory 186) and transmit, to the risk assessment engine 102, the detected threat events periodically (e.g., every 30 days, every 7 days, etc.). In some examples, the network monitor system 180 can transmit, to the risk assessment engine 102, immediately upon the occurrence of a particular threat event (e.g., a particular anomalous behavior pattern) of the endpoint(s) 150. As illustrated, the network monitor system 180 includes various components, including interface 182 for communication (which may be operationally and/or structurally similar to interface 104), at least one processor 184 (which may be operationally and/or structurally similar to processor(s) 106, and which can execute the functionality of the network monitor system 180), and at least one memory 186 (which may be operationally and/or structurally similar to memory 118).

As noted, the access control engine 170 can take corrective or remedial actions, such as, e.g., controlling access of the endpoint(s) 150 to the various system resources of the networked environment 100. In some examples, the access control engine 170 can restrict access of an endpoint to resources within the networked environment, if the endpoint is determined to pose a threat (e.g., the overall risk score of the endpoint satisfies a predetermined risk threshold value). Alternatively, the access control engine 170 can grant access of an endpoint to resources within the networked environment, if the endpoint is determined not to pose a threat (e.g., the overall risk score of the endpoint does not satisfy the predetermined risk threshold value). As illustrated, the access control engine 170 includes various components, including interface 172 for communication (which may be operationally and/or structurally similar to interface 104, 182), at least one processor 174 (which may be operationally and/or structurally similar to processor(s) 106, 184, and which can execute the functionality of the access control engine 170), and at least one memory 176 (which may be operationally and/or structurally similar to memory 118, 186).

As illustrated, one or more endpoints 150 may be present in the example environment 100. Although FIG. 1 illustrates a single endpoint 150, multiple endpoints may be deployed and in use according to the particular needs, desires, or particular implementations of the environment 100. Each endpoint 150 may be associated with a particular user (e.g., an employee or a customer of a financial institution), or may be accessed by multiple users, where a particular user is associated with a current session or interaction at the endpoint 150. Endpoint 150 may be a client device at which the user is linked or associated, or a client device through which the user interacts with risk assessment engine 102 and its risk score calculation engine 108. As illustrated, the endpoint 150 may include an interface 152 for communication (which may be operationally and/or structurally similar to interface 104, 182, and 172), at least one processor 154 (which may be operationally and/or structurally similar to processor 106, 184, and 174), a graphical user interface (GUI) 156, a client application 158, and a memory 160 (similar to or different from memory 118, 186, and 176) storing information associated with the endpoint 150.

The illustrated endpoint 150 is intended to encompass any computing device, such as a desktop computer, laptop/notebook computer, mobile device, smartphone, personal data assistant (PDA), tablet computing device, one or more processors within these devices, or any other suitable processing device. In general, the endpoint 150 and its components may be adapted to execute any operating system. In some instances, the endpoint 150 may be a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the endpoint 150. Such information may include digital data, visual information, or a GUI 156, as shown with respect to the endpoint 150. Specifically, the endpoint 150 may be any computing device operable to communicate with the risk assessment engine 102, the network monitor system 180, the access control engine 170, other end point(s), and/or other components via network 140, as well as with the network 140 itself, using a wireline or wireless connection. In general, the endpoint 150 comprises an electronic computer device operable to receive, transmit, process, and store any appropriate data associated with the environment 100 of FIG. 1.

The client application 158 executing on the endpoint 150 may include any suitable application, program, mobile app, or other component. Client application 158 can interact with the risk assessment engine 102, the network monitor system 180, the access control engine 170, or portions thereof, via network 140. In some instances, the client application 158 can be a web browser, where the functionality of the client application 158 can be realized using a web application or website that the user can access and interact with via the client application 158. In other instances, the client application 158 can be a remote agent, component, or client-side version of the risk score calculation engine 108, or a dedicated application associated with the risk assessment engine 102. In some instances, the client application 158 can interact directly or indirectly (e.g., via a proxy server or device) with the risk assessment engine 102 or portions thereof. The client application 158 may be used to view, interact with, or otherwise transact data exchanges with the risk score calculation engine 108, and to allow interactions for network monitoring and access control via the network monitor system 180 and the access control engine 170.

GUI 156 of the endpoint 150 interfaces with at least a portion of the environment 100 for any suitable purpose, including generating a visual representation of any particular client application 158 and/or the content associated with any components of the risk assessment engine 102, the network monitor system 180, and/or the access control engine 170. For example, the GUI 156 can be used to present screens and information associated with the risk score calculation engine 108 (e.g., one or more interfaces identifying computed risk scores and assessments of the endpoint 150) and interactions associated therewith, as well as network monitoring-related presentations associated with the network monitor system 180 (e.g., one or more interfaces confirming that monitoring data is being collected and being transmitted to the risk assessment engine 102) and/or the access control-related presentations associated with the access control engine 170 (e.g., one or more interfaces noting whether access to a particular resource has been granted or denied). GUI 156 may also be used to view and interact with various web pages, applications, and web services located local or external to the endpoint 150. Generally, the GUI 156 provides the user with an efficient and user-friendly presentation of data provided by or communicated within the system. The GUI 156 may comprise a plurality of customizable frames or views having interactive fields, pull-down lists, and buttons operated by the user. In general, the GUI 156 is often configurable, supports a combination of tables and graphs (bar, line, pie, status dials, etc.), and is able to build real-time portals, application windows, and presentations. Therefore, the GUI 156 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
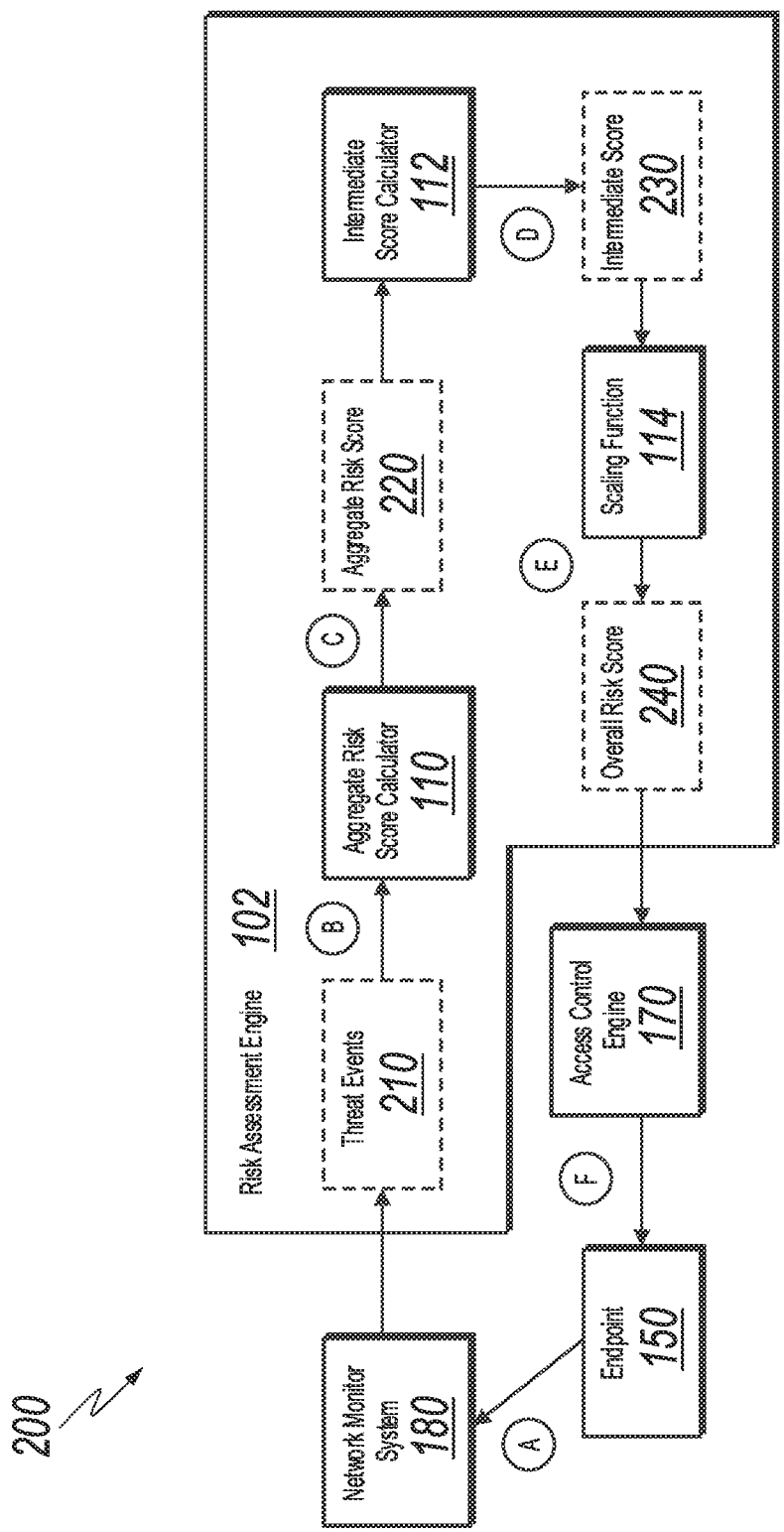
FIG. 2 illustrates a data and control flow of example interactions performed for detecting and remediating threats posed by objects in a networked environment, such as the networked environment 100.

FIG. 2 illustrates a data and control flow of example interactions 200 performed for detecting and remediating threats posed by objects in a networked environment, such as the networked environment 100. As explained further below, this flow diagram describes using a weighted risk scoring and scaling algorithm to determine an overall risk score for an object that can indicate whether the object poses a threat to the networked environment and subsequently controlling access of the object to system and network resources, based on the determination of whether the object poses a threat. As illustrated, FIG. 2 is illustrated with interactions between the network monitor system 180, the risk assessment engine 102, the access control engine 170, and the endpoint 150.

As illustrated in FIG. 2, the network monitor system 180 monitors activities of various objects (including endpoint 150) in the networked environment, and detect the threat events of endpoint 150 (A). In some instances, the network monitor system 180 can store the detected threat events for each object (including endpoint 150), and transmit, to the risk assessment engine 102, the detected threat events of the various objects, including endpoint 150 periodically (e.g., every 30 days, every 7 days, etc.). In some instances, the network monitor system 180 can transmit, to the risk assessment engine 102, immediately upon the detection of a particular threat event of the endpoint 150 (e.g., a particular anomalous behavior pattern). For ease of reference and discussion, the following description describes the operations of the risk assessment engine 102 and the access control engine 170, as being performed with respect to a particular object, namely endpoint 150. However, it will be understand that the same operations would be performed for other monitored objects in the networked environment 100.

After obtaining the threat events 210 of the endpoint 150 from the network monitor system 180, the aggregate risk score calculator 110 (of the risk assessment engine 102) can compute an aggregate risk score 220 based on the threat events 210 and a set of severity scores corresponding to the threat events 210 (C). In some implementations, the risk assessment engine 102 can evaluate the threat events 210 and categorize the events into different types of threat events, where each type of threat event has a particular severity level corresponding to it. For example, the threat events can be categorized into the following types of threats: low, medium, high, and critical. The aggregate risk score calculator 110 determines a count of events of each type and then uses the severity levels/scores corresponding to each type (as stored, e.g., in memory 118) to compute an aggregate risk score for the particular type of event. The aggregate risk scores for each type of event can be combined to obtain the aggregate risk score for endpoint 150 for a certain period (e.g., one week, 90 days, etc.).

The aggregate risk score calculator 110 provides the aggregate risk score 220 to the intermediate score calculator 112, which can then compute, for the endpoint 150, an intermediate score 230 using the aggregate risk score 220 and one or more factors (D), such as the number of distinct use cases triggered during detected threat events, the number of MITRE attacks tactics used during the detected threat events, and the category of the endpoint 150.

In some cases, cybersecurity use cases can be designed to generate alerts on potential threats. The cybersecurity use cases can be built based on, for example, MITRE framework. When a threat event occurs, one or more use cases can generate alert(s) on the threat event. In some cases, the number of use cases triggered by the threat event can indicate a severity level of the threat event. For example, a threat event triggering more use cases is deemed as higher threat.

In some instances, an end point can use one or more tactics defined based on, for example, MITRE framework during a threat event. The number of tactics used during the threat event can be counted to determine a severity level of the threat event. For example, a threat event using more tactics is deemed as higher threat.

The intermediate score calculator 112 can provide the intermediate score 230 to a scaling function 114, which can scale the computed intermediate score to obtain an overall risk score 240 (E), where the overall risk score 240 can be a number between 0.0 and 1.0.

After determining the overall risk score 240 for the endpoint 150, the risk assessment engine 102 can compare the overall risk score 240 with a predetermined risk threshold value. If the overall risk score 240 satisfies the predetermined risk threshold value, the risk assessment engine 102 determines that the endpoint 150 poses a threat. On the other hand, if the overall risk score 240 does not satisfy the predetermined risk threshold value, the risk assessment engine 102 determines that the endpoint 150 does not poses a threat. In either scenario, the risk assessment engine 102 sends the assessment of whether the endpoint 150 poses a threat (e.g., a message with a flag or indicator (0 or 1) indicating whether the endpoint 150 poses a threat or not). As explained above, in some alternative implementations, the risk assessment engine 102 can transmit the overall risk score 240 to the access control engine 170, which in turn can determine (using the above-described operations) whether the endpoint 150 poses a threat.

The access control engine 170 can control access of the endpoint 150 to resources with the networked environment (F) based on the determination of whether the endpoint 150 poses a threat or not. If the access control engine 170 determines that the endpoint 150 poses a threat (or receives an indication of the same), it can take a corrective action, e.g., in the form of restricting access of the endpoint 150 to resources within the networked environment (F). Alternatively, if the access control engine 170 determines that the endpoint 150 does not poses a threat (or receives an indication of the same), it can take an action, e.g., in the form of enabling or granting the endpoint 150 access to resources within the networked environment.

In some implementations, upon determining that the endpoint 150 poses a threat, the risk assessment engine 102 (or the access control engine 170) can send/transmit, over the network 140 and via an interface (e.g., the human threat evaluation interface 116 described in FIG. 1), the threat assessment to a system administrator device, where a human verifier can evaluate whether the detected threat is an actual threat or not—before restricting access of the endpoint 150. The human verifier's determination of whether the endpoint 150 poses a threat can subsequently be provided (e.g., a message with a flag or indicator (0 or 1) indicating whether the endpoint 150 poses a threat or not) to the risk assessment engine 102 and/or the access control engine 170. Similar to the above description, the access control engine 170 can then take action regarding granting or denying resource access in view of the human verifier's determination. Additionally, or alternatively, in some implementations, the human verifier may also provide instructions regarding the type of action to take in view of its determination (e.g., grant access, deny access, limit access to certain sensitive resource while allowing access to other less sensitive resources, etc.). The access control engine 170 can, in turn, control access in the manner specified by the human verifier's determination and indication.

It should be noted that FIG. 2 only provides an example of the flows and interactions between an example set of components performing the operations described herein. Additional, alternative, or different combinations of components, interactions, and operations may be used in different implementations.

Figure 3:
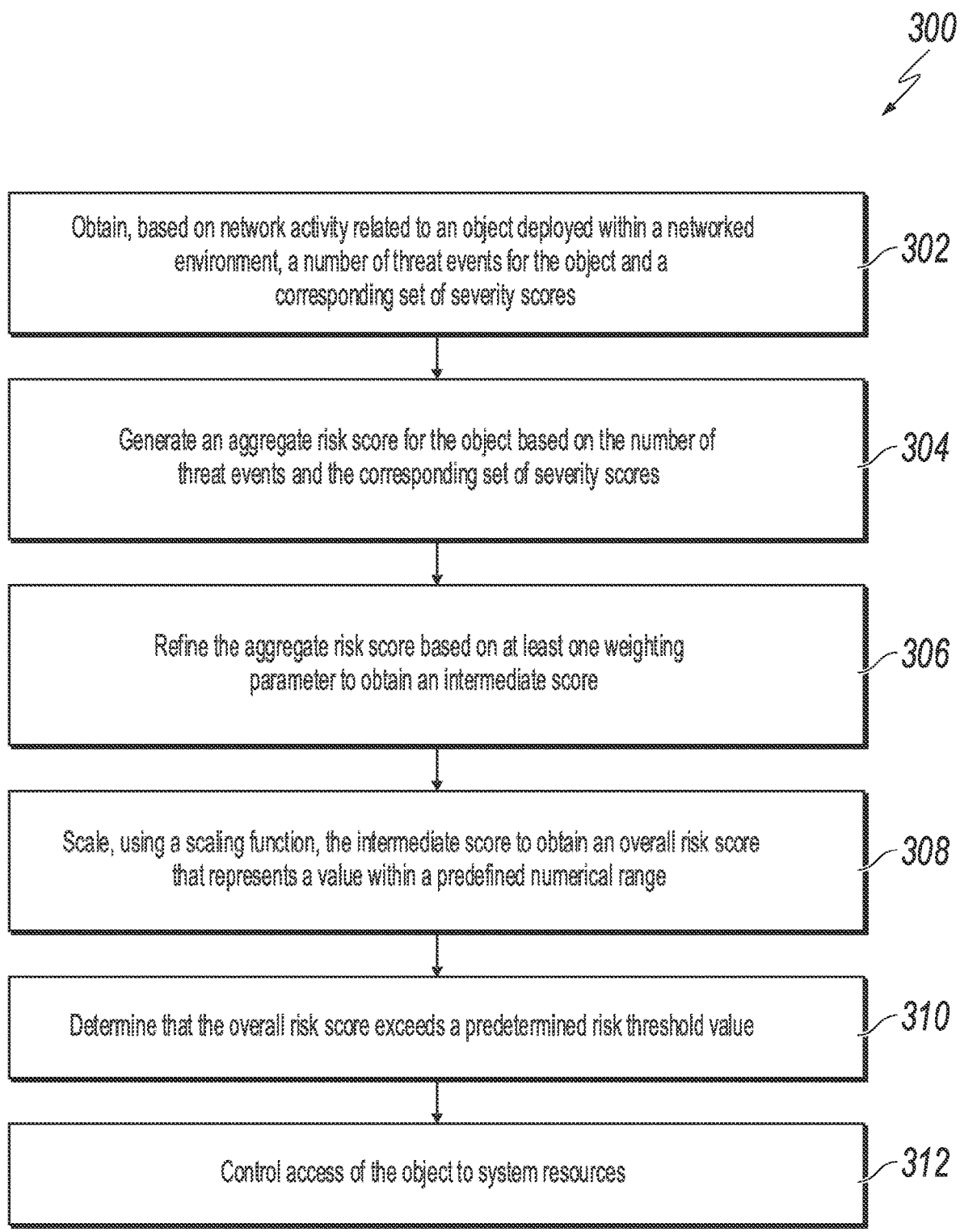
FIG. 3 is a flow diagram of an example method for assessing risks of objects using a weighted risk scoring algorithm and controlling access of the objects to system resources.

FIG. 3 is a flow diagram of an example method 300 for detecting and remediating threats posed by objects in a networked environment, such as the networked environment 100. As explained further below, this flow diagram describes using a weighted risk scoring and scaling algorithm to determine an overall risk score for an object that can indicate whether the object poses a threat to the networked environment and subsequently controlling access of the object to system and network resources based on the determination of whether the object poses a threat. It should be understood that method 300 may be performed, for example, by any suitable system, environment, software, and hardware, or a combination of systems, environments, software, and hardware as appropriate. In some instances, method 300 can be performed by one or more components of the environment 100, including, among others, the risk assessment engine 102, the access control engine 170, or portions thereof, described in FIG. 1, as well as other components or functionality described in other portions of this description. In other instances, the method 300 can be performed by a plurality of connected components or systems, such as those illustrated in FIG. 2. Any suitable system(s), architecture(s), or application(s) can be used to perform the illustrated operations.

In one instance, method 300 describes a method performed for one or more objects in a computer network at a predetermined interval (e.g., every 30 days, every 7 days, etc.). The object can be, e.g., the endpoint 150 described in FIG. 1. In other instances, the method may be performed for the one or more objects upon the occurrence of a particular event (e.g., detecting a particular anomalous behavior pattern of an object).

At 302, the risk assessment engine 102 can obtain, based on network activity related to an object deployed within a networked environment, a number of threat events for the object and a corresponding set of severity scores. Examples of threat events include, among others, detection of viruses, detection of ransomware, and detection of malicious actors attempting to gain unauthorized access to computer systems and networks.

In some instances, the risk assessment engine 102 can obtain the number of threat events for the object and the corresponding set of severity scores in response to determining an anomalous behavior by the object. For example, if a number of threat events of the object in a predetermined period of time exceeds a predetermined threshold, the object can be determined to demonstrate an anomalous behavior. In some instances, the number of threat events for the object and the corresponding set of severity scores are obtained in response to determining occurrence of a predetermined event that triggers risk score generation for a plurality of objects in the networked environment. For example, the predetermined event can be reaching a predetermined interval (e.g., every 30 days, every 7 days, etc.).

In some cases, the risk assessment engine 102 can evaluate the threat events 210 and categorize the events into different types of threat events, where each type of threat event has a particular severity level corresponding to it. For example, the threat events can be categorized into the following types of threats: low, medium, high, and critical. In some instances, the severity score can be a positive integer that ranges from low (which is assigned a severity score of 20), to medium (which is assigned a severity score of 40), to high (which is assigned a severity score of 60), to critical (which is assigned a severity score of 80). When the risk assessment engine obtains a number of threat events, the risk assessment engine can identify the type(s) of threat events included in the number of threat events, and then obtain one or more severity scores corresponding to the type(s) of threat events.

At 304, the risk assessment engine 102 can generate an aggregate risk score for the object based on the number of threat events and the corresponding set of severity scores. In some instances, the risk assessment engine can compute an aggregate risk score based on activity related to the object over a predetermined aggregation period (e.g., 90 days). The aggregate risk score can be computed by combining the severity of threat events over the predetermined aggregation period. For example, the aggregate risk score computation can be represented using the following equation:

$$\text{Aggregate Risk Score} = \sum_i \text{severity}_i * \text{events\_count}_i$$

As used in the above equation, severity$_i$ represents a severity score of i$^{th}$ type of threat event, and events_count$_i$ represents a number of threat events of the i$^{th}$ type over the predetermined aggregation period. The risk assessment engine 102 can determine a count of events of each type and then uses the severity levels/scores corresponding to each type (as stored, e.g., in memory 118) to compute an aggregate risk score for the particular type of event. The aggregate risk scores for each type of event can be combined to obtain the aggregate risk score for endpoint 150 for a certain period (e.g., one week, 90 days, etc.).

For example, assuming that 100 events occur in a certain period of time. 20 of the 100 events are of Type A, 40 of the 100 events are of Type B, and 40 of the 100 events are Type C. Type A has a severity score of 40, Type B has a severity score of 20, and Type C has a severity score of 60. The aggregate risk score can be computed as 40*20+20*40+60*40=4000.

Figure 4:
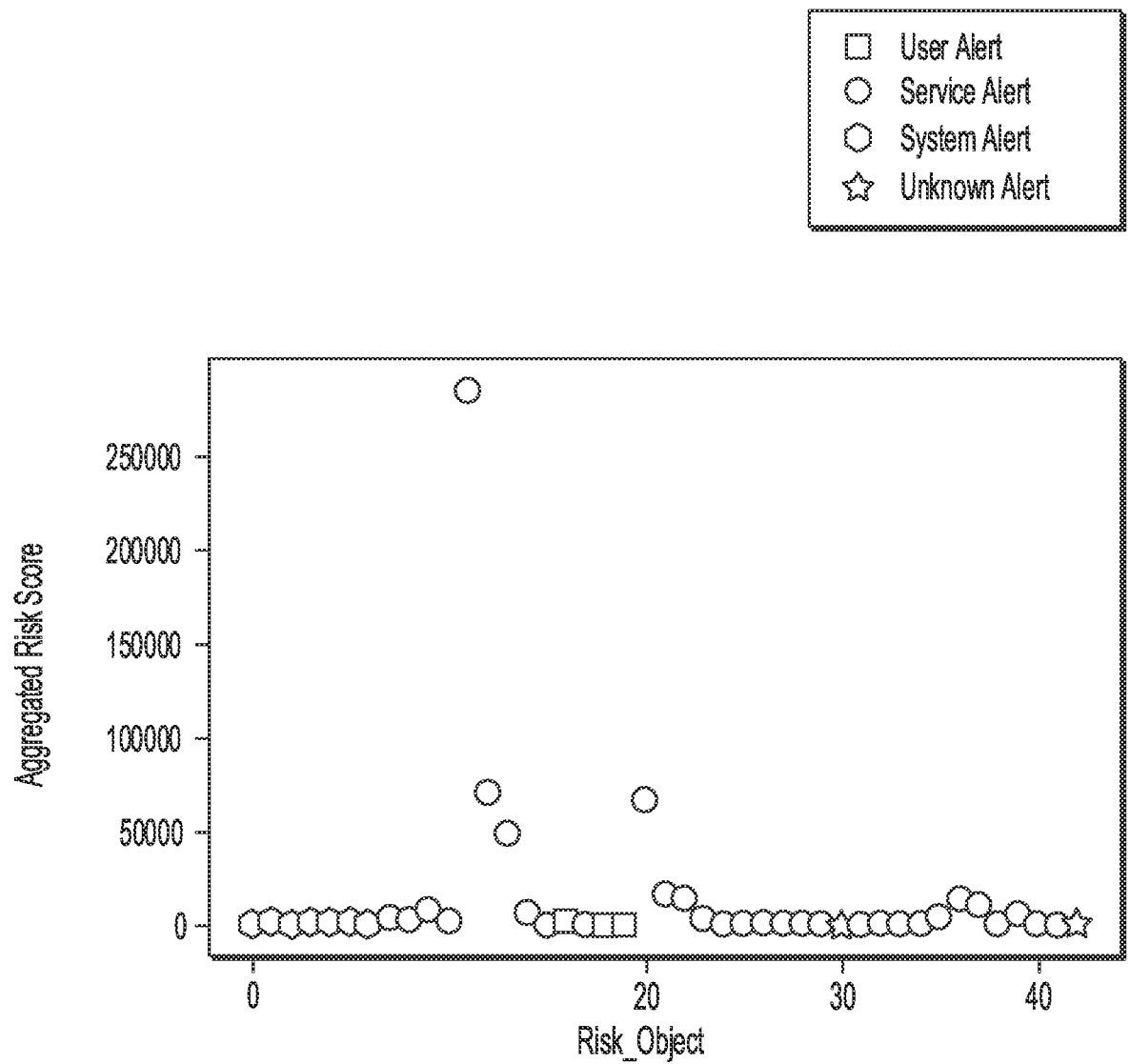
FIG. 4 illustrates example experiment results of an aggregate risk scoring approach without scaling.

FIG. 4 illustrates example experiment results of evaluating aggregate risk scores for four categories of objects (user, service, system, and unknown) in a networked environment. As this figure illustrates, without any upper bounds or without taking into account object categories or other tunable factors discussed below (e.g., in operation 306 and as described above with reference to FIG. 2), it is difficult to discern between the aggregate risk scores for a majority of the objects in the four different object categories. Moreover, as this FIG. 4 also illustrates, most of the aggregate risk scores reflected here correspond to service accounts, which are normally used by administrators and which typically perform actions that may be considered anomalous behavior for user accounts, but are routine operations for service accounts. This only further illustrates that an unweighted and unscaled aggregate risk score can be biased towards high scores generated by benign objects, while leaving unidentified other types of objects and the risk posed by potential APTs that may have compromised those objects because of their relatively lower aggregate risk scores.

At 306, the risk assessment engine 102 can refine the aggregate risk score (as computed at 304) based on at least one weighting parameter to obtain an intermediate score. In some implementations, the risk assessment engine 102 can compute an intermediate score using the aggregate risk score and one or more factors, including the number of distinct use cases triggered during the detected threat events, the number of MITRE attacks tactics used during the detected threat events, and the category of the object. For example, the intermediate risk score computation can be represented using the following equation:

Intermediate score=Aggregate Risk Score*Category*use_case_count*2$^{tactic\_count}$ As used in the above equation, Category is a positive integer that represents a tunable weight parameter assigned to the object based on its category. For example, some implementations can have 4 object categories: System account, Service Account, User account, and Unknown, which can have, e.g., default weight parameters of 0.1, 0.4, 1.5, and 1.5, respectively. One skilled in the art will appreciate that the default parameter values are example values and the values can be modified as appropriate for the needs of different systems and environments.

use_case_count is a positive integer that represents a number of distinct use cases that are triggered during the detected threat events over the predetermined aggregation period. For example, assuming that an object posed three threat events A, B, and C during the predetermined aggregation period. Event A triggered two use cases, namely case_1 and case_11. Event B triggered four use cases, namely case_2, case_7, case_10, and case_11. Event C triggered three use cases, namely case_1, case_11, and case_13. Then the distinct use cases triggered by the object over the predetermined aggregation period are case_1, case_2, case_7, case_10, case_11, and case_13. The use_case_count in this specific example is equal to 6.

tactic_count is a positive integer that represents the number of distinct MITRE tactics used during the detected threat events over the predetermined aggregation period. For example, assuming that an object posed three threat events A, B, and C during the predetermined aggregation period. The object used two tactics in Event A, namely tactic_1 and tactic_11. The object used four tactics in Event B, namely tactic_2, tactic_7, tactic_10, and tactic_11. The object used three tactics in Event C, namely tactic_1, tactic_11, and tactic_13. Then the distinct MITRE tactics used during the detected threat events over the predetermined aggregation period are tactic_1, tactic_2, tactic_7, tactic_10, tactic_11, and tactic_13. The tactic_count in this specific example is equal to 6. The intermediate score formulation can include more variables that those described above.

At 308, the risk assessment engine can scale, using a scaling function, the intermediate score to obtain an overall risk score that represents a value within a predefined numerical range. In some instances, the predefined numerical range is a numerical range between 0.0 and 1.0.

In some implementations, the scaling function can be a modified sigmoid function, such as a logarithmic sigmoid function. The logarithmic sigmoid function is defined as the following function that assigns to any positive real number x (such as the computed intermediate score), a value that is represented using the following function:

$$\frac{\ln(1 + x/w)}{1 + \ln(1 + x/w)}$$

In the above equation, ln represents the natural logarithm, and w represents a positive integer weight parameter (which, in some implementations, can have the value of 1000). The w parameter is a tunable parameter that can be adjusted or tuned depending on the needs of the system. In some cases, w can be directly proportional to the severity scores, where higher severity scores correspond to a higher value of w. For example, when the set of severity scores is 20, 40, 60, and 80, w can be set to 1000, whereas when the set of severity scores is 2, 4, 6, and 8, w can be set to 100.

The above-described logarithmic sigmoid function provides broad advantages over a regular sigmoid function (or a transformed sigmoid function that centers the sigmoid function at 0) in that the logarithmic sigmoid function grows towards the upper bound (e.g., the number 1 in a range from 0.0 to 1.0) slower than the regular/transformed sigmoid functions, so the logarithmic sigmoid function can spread the scores more evenly in the range of 0.0 to 1.0 than the transformed/regular sigmoid functions. A regular sigmoid function S(x) is greater than or equal to ½ for all x greater than or equal to 0. When this function is centered at 0, the resulting function is referred to as a transformed sigmoid function, which assigns to any positive real number x, the value that is represented using the following function:

$$\frac{1-e^{-x/w}}{1+e^{-x/w}}$$

where w represents a positive integer weight parameter. Because the transformed sigmoid function is centered at 0, much like the logarithmic sigmoid function, both functions can be compared side-by-side in a meaningful manner.

Figure 5:
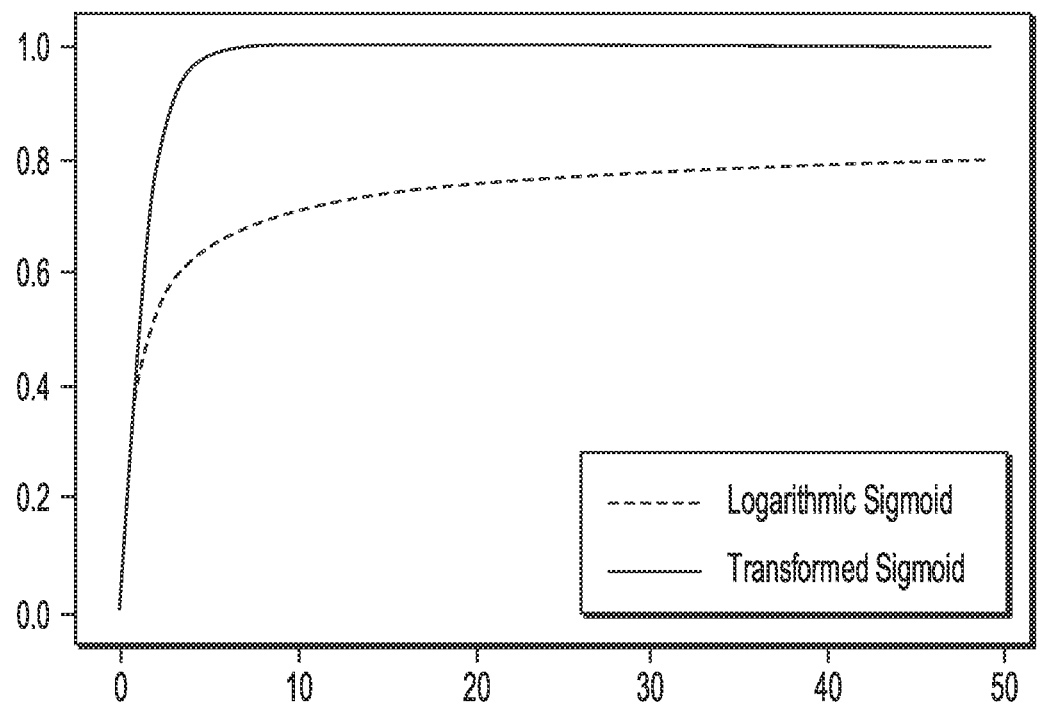
FIG. 5 illustrates example comparison results of a logarithmic sigmoid function and a transformed sigmoid function.
Figure 6:
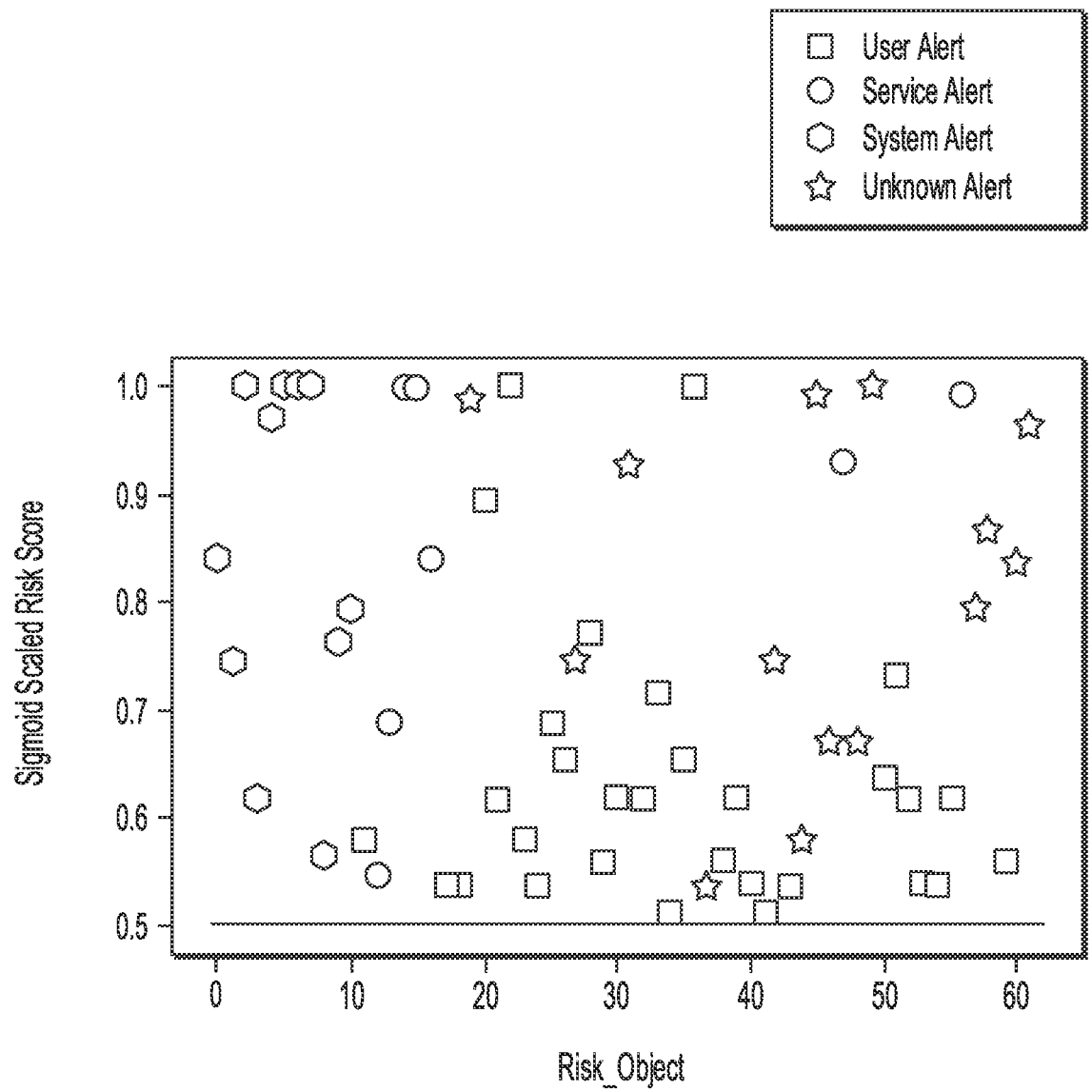
FIG. 6 illustrates example experiment results of a weighted risk scoring algorithm using the transformed sigmoid scaling function.
Figure 7:
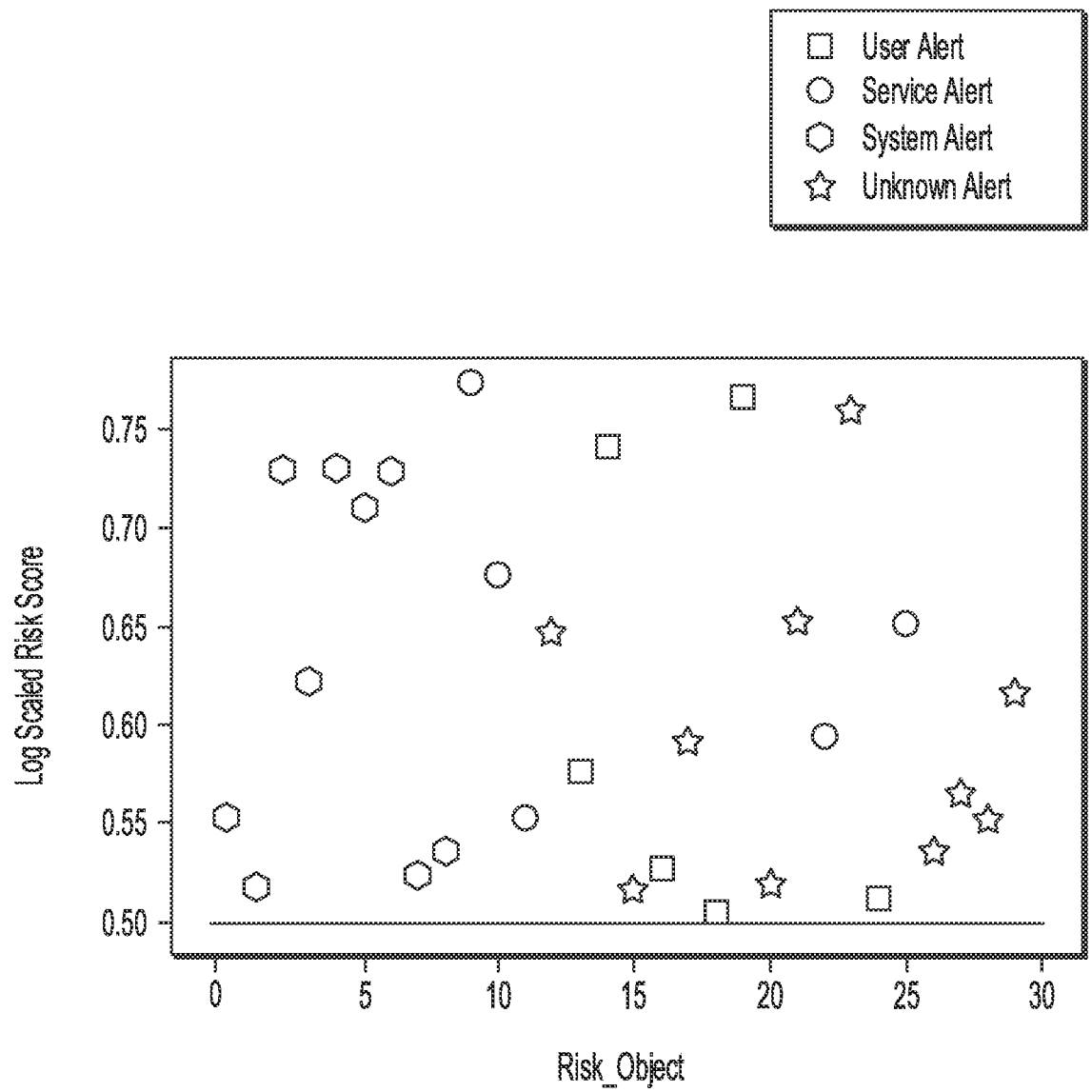
FIG. 7 illustrates example experiment results of a weighted risk scoring algorithm using the logarithmic sigmoid scaling function.

A comparison of the scaling between the above-described logarithmic sigmoid function and the transformed sigmoid function is depicted in FIG. 5. As that figure shows, the two functions perform similarly for smaller numbers (0 to 5) on the x-axis. However, as the numbers grow, the transformed sigmoid function exponentially moves to 1 for small numbers whereas the logarithmic function slowly grows to 1 over the distribution of numbers on the x-axis. In contrast, the logarithmic sigmoid function grows towards the upper bound 1 slower than the transformed sigmoid function, and as a result, the logarithmic sigmoid function can spread the scores more evenly in the range of 0.0 to 1.0 than the transformed sigmoid function. The resulting effect of scaling using both functions is illustrated in FIGS. 6 and 7, which are further described below.

Returning to FIG. 3, at 310, the risk assessment engine 102 (or the access control engine 170) can compare the overall risk score for the object to a predetermined risk threshold value (e.g., 0.5) to determine whether the overall risk score satisfied (e.g., meets or exceeds) the predetermined risk threshold value. The predetermined risk threshold value can be a static, but tunable, value, and can be adjusted to any value according to the risk score distributions. Alternatively, the risk threshold value can be a dynamically determined value. For example, the risk threshold value can be dynamically and individually assigned to different user accounts, so two different user accounts can have two different risk threshold values.

In some instances, two categories of objects can have different risk threshold values. For example, Service account objects can have a higher risk threshold value (e.g., 0.7) than the User account objects (e.g., 0.5). This may be done, e.g., to account for the overall risk scores of Service account objects being typically higher than those of the User account objects.

At 312, the access control engine 170 can control access of the object to system/network resources based on whether the overall risk score satisfies (e.g., meets or exceeds) the predetermined risk threshold value. If the overall risk score satisfies (e.g., meets or exceeds) the predetermined risk threshold, the object is determined (e.g., by the risk assessment engine 102 or the access control engine 170) to represent a threat, in which case one or more corrective actions can be taken, such as, e.g., suspending or limiting network access for that object, limiting access to one or more sensitive system resources, launching threat removal agents aimed at purging the detecting threat, triggering closer monitoring of the object, etc. Alternatively, if the overall risk score does not satisfy (e.g., is below) the predetermined risk threshold, the object is determined not to represent a threat (e.g., by the risk assessment engine 102 or the access control engine 170), in which case the object can be granted access to resources within the networked environment.

In some implementations, upon determining that an object poses a threat and before applying any corrective action, the risk assessment engine 102 (or the access control engine 170) can send the threat assessment of the object to a human verifier (e.g., a user of a system administrator device) to evaluate whether the detected threat is an actual threat or not. The human verifier's determination of whether the endpoint 150 poses a threat can subsequently be provided (e.g., a message with a flag or indicator (0 or 1) indicating whether the endpoint 150 poses a threat or not) to the risk assessment engine 102 and/or the access control engine 170. Similar to the above description, the access control engine 170 can then take action regarding granting or denying resource access in view of the human verifier's determination. Additionally, or alternatively, in some implementations, the human verifier may also provide instructions regarding the type of action to take in view of its determination (e.g., grant access, deny access, limit access to certain sensitive resource while allowing access to other less sensitive resources, etc.). The access control engine 170 can, in turn, control access in the manner specified by the human verifier's determination and indication.

FIGS. 6 and 7 show example experiment results illustrating the effect of evaluating aggregate risk scores for different objections upon applying the weighted risk scoring algorithm using a transformed sigmoid scaling function, and the weighted risk scoring algorithm using the logarithmic sigmoid scaling function as described in method 300 of FIG. 3. As noted previously, there may be four different object categories, including System account, Service Account, User account, and Unknown, which can have weight parameters of 0.5, 0.05, 1.5, and 1.5, respectively. For illustrative purposes, we assume that the predetermined risk threshold value is set to 0.5, such that when an overall risk score exceeds 0.5, an alert is triggered (i.e., the object is determined to pose a threat). For this comparison, the weights applied to the transformed sigmoid function and the logarithmic sigmoid function are both set to 1000.

Turning first to FIG. 6, which illustrates example experiment results of the weighted risk scoring algorithm using the transformed sigmoid scaling function. The transformed sigmoid scaling function is the transformed sigmoid function defined and described with reference to FIG. 5. The results of the weighted risk scoring algorithm using the transformed sigmoid scaling function are generated using the method 300 as described in FIG. 3, where the transformed sigmoid scaling function is used as the scaling function in 308.

As illustrated in FIG. 6, the total alerts generated by the weighted risk scoring algorithm using the transformed sigmoid scaling function is 62. The algorithm performs better than the aggregate risk scoring approach without scaling in terms of elevating APTs, in particular in the User account category, due to using the weighting parameters to obtain intermediate scores. However, the algorithm was generating highly condensed scores shooting quickly towards 1, thus injecting more noise in the form of false positives (i.e., multiple objects being identified as risky or posing a threat when in fact they are benign).

FIG. 7 illustrates example experiment results of the weighted risk scoring algorithm using the logarithmic sigmoid scaling function. The results of the weighted risk scoring algorithm using the logarithmic sigmoid scaling function are generated using the method 300 as described in FIG. 3, where the logarithmic sigmoid scaling function is used as the scaling function in 308.

As illustrated in FIG. 7, the total alerts generated by the weighted risk scoring algorithm using the logarithmic sigmoid scaling function is 30. FIG. 7 shows that the weighted risk scoring algorithm using the logarithmic sigmoid scaling function performs better than the aggregate risk scoring approach without scaling and the weighted risk scoring algorithm using the transformed sigmoid scaling function, in terms of both elevating APTs, and evenly scaling and spreading the risk scores. For example, unlike the transformed sigmoid scaling, the logarithmic sigmoid scaling achieves more evenly spread risk scores that are not concentrated near 1. As a result, fewer objects are identified as having an overall risk score greater than 0.5 (the predetermined risk threshold) and thus, there is relatively less noise in the form of false positives (i.e., multiple objects being identified as risky or posing a threat when in fact they are benign). By removing the noise in the form of false positives, the weighted risk scoring algorithm with the logarithmic sigmoid function elevates the true threats, many of which are APTs that are otherwise can remain hidden among the various objects and their threat indications. In this manner, the weighted risk scoring algorithm with logarithmic sigmoid scaling enables more accurate threat detection, including for those types of threats (e.g., APTs) that can remain undetected for long periods of time.

The above description is provided in the context of network security and in particular, accurate detection of threats posed by objects in a networked environment and taking corrective action in response to such detection. One skilled in the art will appreciate that the above described techniques are not limited to just this network security application but can be applicable in other contexts. For example, in some implementations, the above described techniques can be used to detect credit card fraud and taking corrective actions to stop further fraud. Using the above-described algorithm, fraudulent activity can be detected, e.g., in credit card/bank account transactions, and corrective actions can be taken to, e.g., stop further fraud, identify the fraudulent actor, and/or put all further transactions on the card on hold until a new payment token (e.g., credit card is issued). In such applications, a monitoring system can generate an intermediate score for a particular bank account by refining the aggregate risk score for this account using one or more factors, and then further scale the intermediate score based on the logarithmic sigmoid function to obtain an overall risk score. The monitoring system can compare the overall risk score with a threshold. If the overall risk score exceeds the threshold, the monitoring system can take corrective actions, including stopping further transactions on the account or report the credit card holder for further investigations.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining, based on network activity related to an object deployed within a networked environment, a number of threat events for the object and a corresponding set of severity scores;
generating an aggregate risk score for the object based on the number of threat events and the corresponding set of severity scores, wherein the aggregate risk score is generated using the following equation:

$$\text{Aggregrate Risk Score} = \sum_i \text{severity}_i * \text{events\_count}_i$$

wherein $\text{severity}_i$ represents a severity score of $i^{th}$ type of threat event, and $\text{events\_count}_i$ represents a number of threat events of the $i^{th}$ type;
refining the aggregate risk score based on at least one weighting parameter to obtain an intermediate score;
scaling, using a scaling function, the intermediate score to obtain an overall risk score that represents a value within a predefined numerical range; and
controlling access of the object to system resources based on whether the overall risk score exceeds a predetermined risk threshold value.

2. The computer-implemented method of claim 1, wherein the scaling function is a logarithmic sigmoid function.

3. The computer-implemented method of claim 2, wherein the logarithmic sigmoid function is represented by the following function:

$$\frac{\ln(1+x/w)}{1+\ln(1+x/w)}$$

wherein x represents the intermediate score and w represents a tunable weight parameter.

4. The computer-implemented method of claim 1, wherein the at least one weighting parameter comprises one or more of: a number of distinct use cases triggered during the number of threat events, a number of MITRE attacks tactics used during the number of threat events, and a category of the object.

5. The computer-implemented method of claim 4, wherein the intermediate score is determined using the following equation:

Intermediate score=Aggregate Risk Score*Category*use_case_count*$2^{tactic\_count}$ wherein Category represents a category of the object, use_case_count represents a number of distinct use cases triggered during the number of threat events, and tactic_count represents a number of MITRE attacks tactics used during the number of threat events.

6. The computer-implemented method of claim 1, wherein the number of threat events for the object and the corresponding set of severity scores are obtained in response to determining:

an anomalous behavior by the object; or occurrence of a predetermined event that triggers risk score generation for a plurality of objects in the networked environment.

7. The computer-implemented method of claim 1, wherein the predefined numerical range is a numerical range between 0.0 and 1.0.

8. The computer-implemented method of claim 1, wherein controlling the access of the object to the system resources comprises:

restricting access of the object to resources within the networked environment when the overall risk score exceeds the predetermined risk threshold value, or enabling access of the object to resources within the networked environment when the overall risk score does not exceed the predetermined risk threshold value.

9. A system comprising:

at least one memory storing instructions; and at least one hardware processor interoperably coupled with the at least one memory, wherein execution of the instructions by the at least one hardware processor causes performance of operations comprising:

obtaining, based on network activity related to an object deployed within a networked environment, a number of threat events for the object and a corresponding set of severity scores;

generating an aggregate risk score for the object based on the number of threat events and the corresponding set of severity scores, wherein the aggregate risk score is generated using the following equation:

$$\text{Aggregate Risk Score} = \sum_i \text{severity}_i * \text{events\_count}_i$$

wherein $\text{severity}_i$ represents a severity score of $i^{th}$ type of threat event, and $\text{events\_count}_i$ represents a number of threat events of the $i^{th}$ type;

refining the aggregate risk score based on at least one weighting parameter to obtain an intermediate score;

scaling, using a scaling function, the intermediate score to obtain an overall risk score that represents a value within a predefined numerical range; and controlling access of the object to system resources based on whether the overall risk score exceeds a predetermined risk threshold value.

10. The system of claim 9, wherein the scaling function is a logarithmic sigmoid function.

11. The system of claim 10, wherein the logarithmic sigmoid function is represented by the following function:

$$\frac{\ln(1+x/w)}{1+\ln(1+x/w)}$$

wherein x represents the intermediate score and w represents a tunable weight parameter.

12. The system of claim 9, wherein the at least one weighting parameter comprises one or more of: a number of distinct use cases triggered during the number of threat events, a number of MITRE attacks tactics used during the number of threat events, and a category of the object.

13. The system of claim 12, wherein the intermediate score is determined using the following equation:

Intermediate score=Aggregate Risk Score*Category*use_case_count*$2^{tactic\_count}$ wherein Category represents a category of the object, use_case_count represents a number of distinct use cases triggered during the number of threat events, and tactic_count represents a number of MITRE attacks tactics used during the number of threat events.

14. The system of claim 9, wherein the number of threat events for the object and the corresponding set of severity scores are obtained in response to determining:

an anomalous behavior by the object; or occurrence of a predetermined event that triggers risk score generation for a plurality of objects in the networked environment.

15. The system of claim 9, wherein the predefined numerical range is a numerical range between 0.0 and 1.0.

16. A non-transitory, computer-readable medium storing computer-readable instructions, that upon execution by at least one hardware processor, cause performance of operations, comprising:

obtaining, based on network activity related to an object deployed within a networked environment, a number of threat events for the object and a corresponding set of severity scores;

generating an aggregate risk score for the object based on the number of threat events and the corresponding set of severity scores, wherein the aggregate risk score is generated using the following equation:

$$\text{Aggregate Risk Score} = \sum_i \text{severity}_i * \text{events\_count}_i$$

wherein $\text{severity}_i$ represents a severity score of $i^{th}$ type of threat event, and $\text{events\_count}_i$ represents a number of threat events of the $i^{th}$ type;

refining the aggregate risk score based on at least one weighting parameter to obtain an intermediate score;

scaling, using a scaling function, the intermediate score to obtain an overall risk score that represents a value within a predefined numerical range; and controlling access of the object to system resources based on whether the overall risk score exceeds a predetermined risk threshold value.

17. The non-transitory, computer-readable medium of claim 16, wherein the scaling function is a logarithmic sigmoid function.

18. The non-transitory, computer-readable medium of claim 17, wherein the logarithmic sigmoid function is represented by the following function:

$$\frac{\ln(1+x/w)}{1+\ln(1+x/w)}$$

wherein x represents the intermediate score and w represents a tunable weight parameter.

19. The non-transitory, computer-readable medium of claim 16, wherein the at least one weighting parameter comprises one or more of: a number of distinct use cases triggered during the number of threat events, a number of MITRE attacks tactics used during the number of threat events, and a category of the object.

* * * * *